United States Patent
Jaujou et al.

(10) Patent No.: US 8,164,486 B2
(45) Date of Patent: Apr. 24, 2012

(54) PROCESS AND APPARATUS FOR AIDING IN THE CONCEPTION OF TEXTS FOR A PILOT OR A CONDUCTOR

(75) Inventors: Nicolas Jaujou, Ondes (FR); Laurent Spaggiari, Verdun sur Garonne (FR); Florence Beaujard, Plaisance du Touch (FR); Emmanuelle Castel, Montaigu sur Save (FR)

(73) Assignee: Airbus Operations SAS, Toulouse (FR)

( * ) Notice: Subject to any disclaimer, the term of this patent is extended or adjusted under 35 U.S.C. 154(b) by 378 days.

(21) Appl. No.: 12/433,123

(22) Filed: Apr. 30, 2009

(65) Prior Publication Data
US 2010/0026524 A1 Feb. 4, 2010

(30) Foreign Application Priority Data
Apr. 30, 2008 (FR) ...................................... 08 52956

(51) Int. Cl.
*G01C 21/00* (2006.01)
(52) U.S. Cl. ............ 340/971; 706/47; 706/50; 707/797; 707/999.1; 707/E17.005
(58) Field of Classification Search .................. 340/945, 340/963, 971, 973, 980; 701/3, 9, 14; 707/10, 707/100, 797, E17.005, E17.115, 999.1; 709/203; 706/47, 50; 715/866; 395/183.02, 395/12, 911
See application file for complete search history.

(56) References Cited

U.S. PATENT DOCUMENTS

| | | | |
|---|---|---|---|
| 6,857,102 B1 * | 2/2005 | Bickmore et al. | 715/205 |
| 2006/0218030 A1 * | 9/2006 | Ghosh et al. | 705/8 |
| 2007/0157155 A1 * | 7/2007 | Peters | 717/100 |
| 2008/0126370 A1 * | 5/2008 | Wang | 707/100 |
| 2009/0240767 A1 * | 9/2009 | Zhang | 709/203 |
| 2010/0152923 A1 * | 6/2010 | Aspen et al. | 701/3 |

FOREIGN PATENT DOCUMENTS
EP  1 376 395 A2  1/2004

OTHER PUBLICATIONS

L. Spaggiari, et al., "A Controlled Language at Airbus", In Controlled Language Translation, vol. 28, No. 1, May 15, 2003, XP-002506154, pp. 1-9.

(Continued)

*Primary Examiner* — Brent Swarthout
(74) *Attorney, Agent, or Firm* — Oblon, Spivak, McClelland, Maier & Neustadt, L.L.P.

(57) ABSTRACT

A network of nodes, in which each node is associated with a choice, is used in designing text to be displayed to a user. At least part of the nodes correspond to a choice of a type of text. At least part of the nodes correspond to a choice of a text display context. At least part of the nodes correspond to a determination of whether the text is provided in response to an action of the user. At least part of the nodes correspond to a determination that the message display originates from a transducer. Text design rules are associated with at least part of the nodes. Pathfinding is performed by a designer, using the network of nodes, based on a response to a choice associated with each node encountered in the network of nodes. For each network node encountered during pathfinding, each rule associated with the encountered network node is made available to the designer.

20 Claims, 4 Drawing Sheets

OTHER PUBLICATIONS

Elisa Gavieiro-Villatte, et al., "Open Ended Computerized Overview of Controlled Languages", Proceedings of the Second International Conference on Language Resources and Evaluation, May 31, 2000, XP-002506155, pp. 1133-1134.

David G. Novick, "A Why-What-How Tool for Development and Documentation of Operating Procedures", Proceedings 2000 IEEE International Professioanl Communication Conference, Sep. 24, 2000, XP-010525695, pp. 559-570.

Ronald Verhoeven, et al., "Prototyping Interactive Cockpit Applications", Digital Avionics Systems Conference, Oct. 24, 2004, XP-010764917, pp. 9.A. 3-1-9.A.3-10.

* cited by examiner

PROCESS AND APPARATUS FOR AIDING IN THE CONCEPTION OF TEXTS FOR A PILOT OR A CONDUCTOR

FIELD OF THE DISCLOSURE

The present invention relates to a method and to a device for aiding in the design of texts (messages or labels) for pilots, crew members or drivers. It is applicable in particular to reducing the ambiguity of these texts, to increasing their legibility, their speed of understanding, and thus the quality of piloting and the safety of an airliner. However, the present invention is not limited to the aeronautic sector but to the contrary extends to other vehicle sectors, especially trains, watercraft and road vehicles.

BACKGROUND

It is known that, during normal piloting and even more so in the event of breakdown or danger, a pilot must receive, understand and process numerous texts (messages or labels) in order to ensure piloting quality and vehicle safety. The texts to be displayed are determined by concept creators or "designers" on the basis of recommendations of linguists.

In the aerospace industry, there is known the use of a simplified technical English language based on a set of writing rules, a dictionary and a controlled vocabulary. There is also known the use of rules for the editors of the operational documentation. All of these paper documents are long and difficult to use and they necessitate a lengthy learning period. In fact, it is difficult to find design rules applicable to a particular need.

SUMMARY

The aim of the present invention is to remedy these disadvantages. To this end, the present invention is aimed, according to a first aspect, at a method for aiding in the design of a text to be displayed to a user, characterized in that it is provided with:

a step of constituting a network of nodes associated with choices, at least part of the said nodes corresponding to a choice of type of text, at least part of the said nodes corresponding to a choice of text display context, at least part of the said nodes corresponding to the determination of whether the text responds to an action of the user and at least part of the said nodes corresponding to the determination that a transducer is at the origin of the text display, a step of associating text design rules with at least part of the said nodes, a step of pathfinding in the said network, by a said designer, in response to the choice associated with each node encountered in the course of the said pathfinding, and for each network node encountered in the course of the said pathfinding, a step of making each rule associated with the said network node available to the designer.

It is noted that the term "user" covers in particular a pilot, a crew member or a driver to whom the text to be designed will be displayed, but excludes the designer of the text in question. By virtue of the employment of the present invention, each rule displayed to the designer takes into account the type of text, the context in which the text to be designed will be displayed and the reason for displaying the said text. Thus, for the same type of situation, the rules for composing a text (message or label) are coherent, and the speed at which the user understands it is increased. Finally, the number of rules to be consulted by a designer during the design of a text is generally reduced. It is noted that the choice of type of text is, for example, a choice between the "message" type and the "label" type.

According to particular characteristics, the method comprising the object of the present invention, as briefly presented hereinabove, is additionally provided with a step of saving the displayed rule in memory and a step of displaying at least one rule saved in memory.

According to particular characteristics, the said network is a tree structure possessing a root.

By virtue of these provisions, the start of pathfinding is always similar and there is no loop.

According to particular characteristics, during the step of constituting a network of nodes corresponding to choices and rules to be displayed to a designer, at least part of the said nodes corresponds to the choice of whether an action is expected following display of the text to be designed.

According to particular characteristics, during the step of constituting a network of nodes corresponding to choices and rules to be displayed to a designer, at least part of the said nodes corresponds to the choice of whether the text to be designed is related to an abnormal situation and/or to a warning.

According to particular characteristics, during the step of constituting a network of nodes corresponding to choices and rules to be displayed to a designer, at least part of the said nodes corresponds to the choice of whether the text to be designed is related to a continuous interface or to an event.

According to particular characteristics, during the step of constituting a network of nodes corresponding to choices and rules to be displayed to a designer, at least part of the said nodes corresponds to the choice of whether the text to be designed is related to a pushbutton available to the person viewing the display of the text.

According to particular characteristics, during the step of constituting a network of nodes corresponding to choices and rules to be displayed to a designer, at least part of the said nodes corresponds to the choice of whether the text to be designed is related to a refusal to enter an instruction originating from the person viewing the display of the text.

According to particular characteristics, during the step of constituting a network of nodes corresponding to choices and rules to be displayed to a designer, at least part of the said nodes corresponds to the choice of whether the text to be designed is related to a confirmation requested from the person viewing the display of the text.

According to particular characteristics, during the step of constituting a network of nodes corresponding to choices and rules to be displayed to a designer, at least part of the said nodes corresponds to the choice of whether the text to be designed is related to an item of information representative of a process in progress.

According to particular characteristics, during the step of constituting a network of nodes corresponding to choices and rules to be displayed to a designer, at least part of the said nodes corresponds to the choice of whether the text to be designed is permanent or subject to motion or transformation associated with attributes of the text to be designed.

According to particular characteristics, during the step of constituting a network of nodes corresponding to choices and rules to be displayed to a designer, at least part of the said nodes corresponds to the choice of type of vehicle for which the text to be designed is intended.

According to particular characteristics, during the step of constituting a network of nodes corresponding to choices and rules to be displayed to a designer, at least part of the said nodes corresponds to the choice of type of means for displaying the text to be designed.

According to particular characteristics, during the association step, there are provided, on the one hand, fundamental rules corresponding to a set of rules according to a predetermined choice and, on the other hand, specific rules related to a set of texts to be designed.

According to particular characteristics, during the association step, there are provided rules relating to the use of a glossary, rules relating to a syntactic structure and rules relating to an information content to be displayed.

According to particular characteristics, during the association step, there are provided rules furnishing text patterns.

According to particular characteristics, during the association step, there are provided hypertext links associated with at least part of the nodes of the said network.

In this way it is possible to display links related to choices or to rules, for example for consulting a dictionary, a list of rules or text models or of already designed texts.

According to a second aspect, the present invention is aimed at a device for aiding in the design of a text to be displayed to a user, characterized in that it is provided with:

a means for constituting a network of nodes associated with choices, at least part of the said nodes corresponding to a choice of type of text, at least part of the said nodes corresponding to a choice of text display context, at least part of the said nodes corresponding to the determination of whether the text responds to an action of the user and at least part of the said nodes corresponding to the determination that a transducer is at the origin of the text display, a means for associating text design rules with at least part of the said nodes, a means for pathfinding in the said network, by a said designer, in response to the choice associated with each node encountered in the course of the said pathfinding, and for each network node encountered in the course of the said pathfinding, a means for making each rule associated with the said network node available to the designer.

According to a third aspect, the present invention is aimed at a computer program that can be loaded into an information-technology system, the said program containing instructions permitting employment of the method which is the object of the present invention as briefly explained hereinabove.

According to a fourth aspect, the present invention is aimed at an information medium that can be read by a computer or microprocessor, removable or fixed, containing instructions of an information-technology program, characterized in that it permits employment of the method which is the object of the present invention as briefly explained hereinabove.

Since the advantages, objectives and particular characteristics of this device, of this program and of this medium are similar to those of the method as briefly explained hereinabove, they will not be repeated here.

BRIEF DESCRIPTION OF THE DRAWINGS

Other advantages, objectives and particular characteristics of the present invention will become apparent from the description hereinafter, provided by way of explanation and in no way limitative, with reference to the attached drawings, wherein.

DETAILED DESCRIPTION

Figure 1:
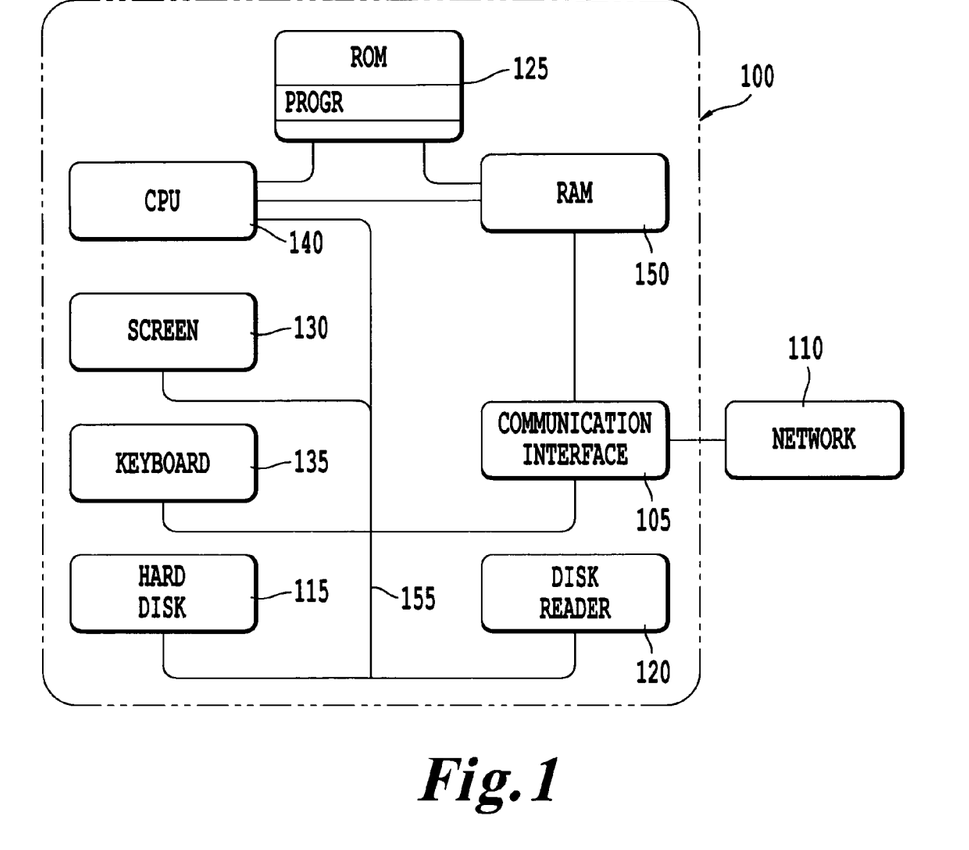
FIG. 1 schematically represents a particular embodiment of the device comprising the object of the present invention.

FIG. 1 shows that, in a particular embodiment, the device which is the object of the present invention has the form of a microcomputer 100 equipped with software that implements the method which is the object of the present invention and with different peripherals. In this case the device constitutes a workstation for designing texts (messages or labels).

Microcomputer 100 is connected to different peripherals, such as a communication interface 105 connected to a network 110 capable of transmitting digital data representative of text contexts, of text design rules, of text models and of texts to be displayed.

Microcomputer 100 is also provided with a storage means 115 such as a hard disk and with a compact-disk reader/writer 120. These storage means 115 and 120 may contain context data, text design rules, text models and texts as well as instructions of a software program that implements the method which is the object of the present invention, which instructions are stored in storage means 115 after they have been read by microcomputer 100. According to one variant, the program that permits the device to employ the present invention is stored in non-volatile memory 125 (known as "ROM", the acronym for "Read Only Memory", in FIG. 1). In a second variant, the program is received by way of communication network 110 and is stored in storage means 115. More generally, an information storage means that can be read by a computer or microprocessor, integrated or not in the device, if necessary removable, contains instructions of a program implementing the method which is the object of the present invention.

Figure 5:
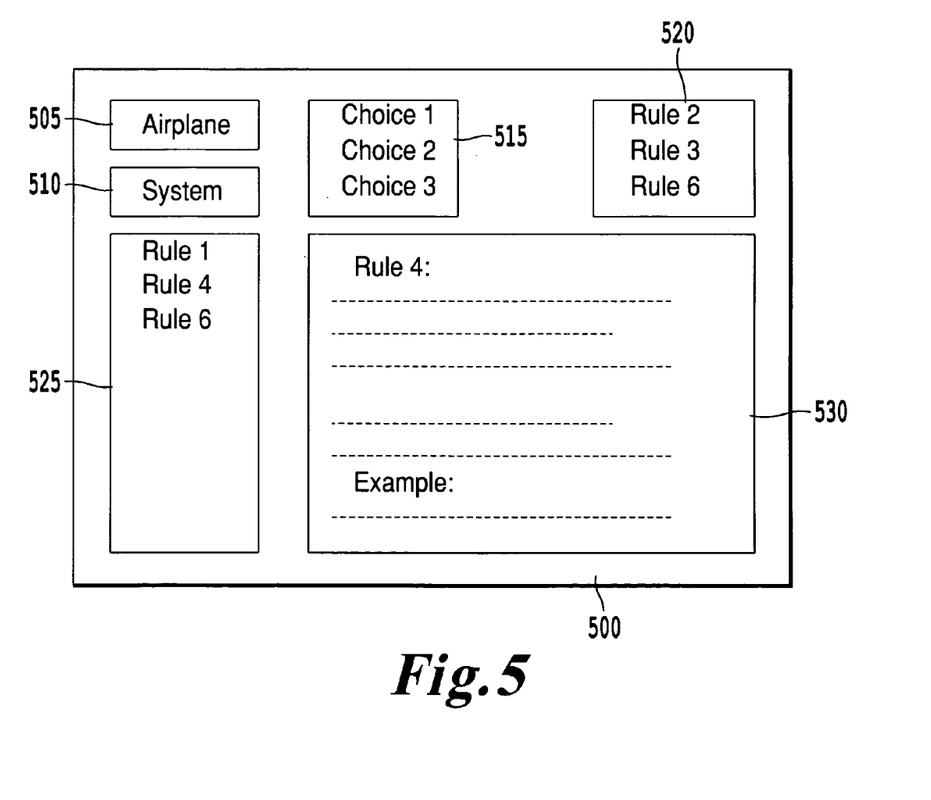
FIG. 5 illustrates a viewing screen displayed during one step of an example of employment of the method which is the object of the present invention.

Microcomputer 100 possesses a screen 130 for viewing the data to be processed and the results of processing, as illustrated in FIG. 5, and for functioning as the user interface, by means of a keyboard 135 and/or pointing means (such as a mouse).

A central unit 140 (known as "CPU", the acronym for "Central Processing Unit", in FIG. 1) executes the instructions of the program implementing the method which is the object of the present invention. During boot-up, the program for implementing the method which is the object of the present invention stored in non-volatile memory, such as read-only memory 125, is transferred into a random-access memory 150, which then contains the instructions of this software program as well as registers for storing in memory the variables necessary for employment of the invention.

A communication bus 155 permits communication between the different elements belonging or connected to microcomputer 100. The representation of bus 155 is not limitative. In particular, central unit 120 is capable of communicating instructions to any element of the device directly or by way of another element of the device.

During employment of the method and of the device comprising objects of the present invention, a user makes use of a network of nodes representing choices and text design rules to be displayed.

Figure 2:
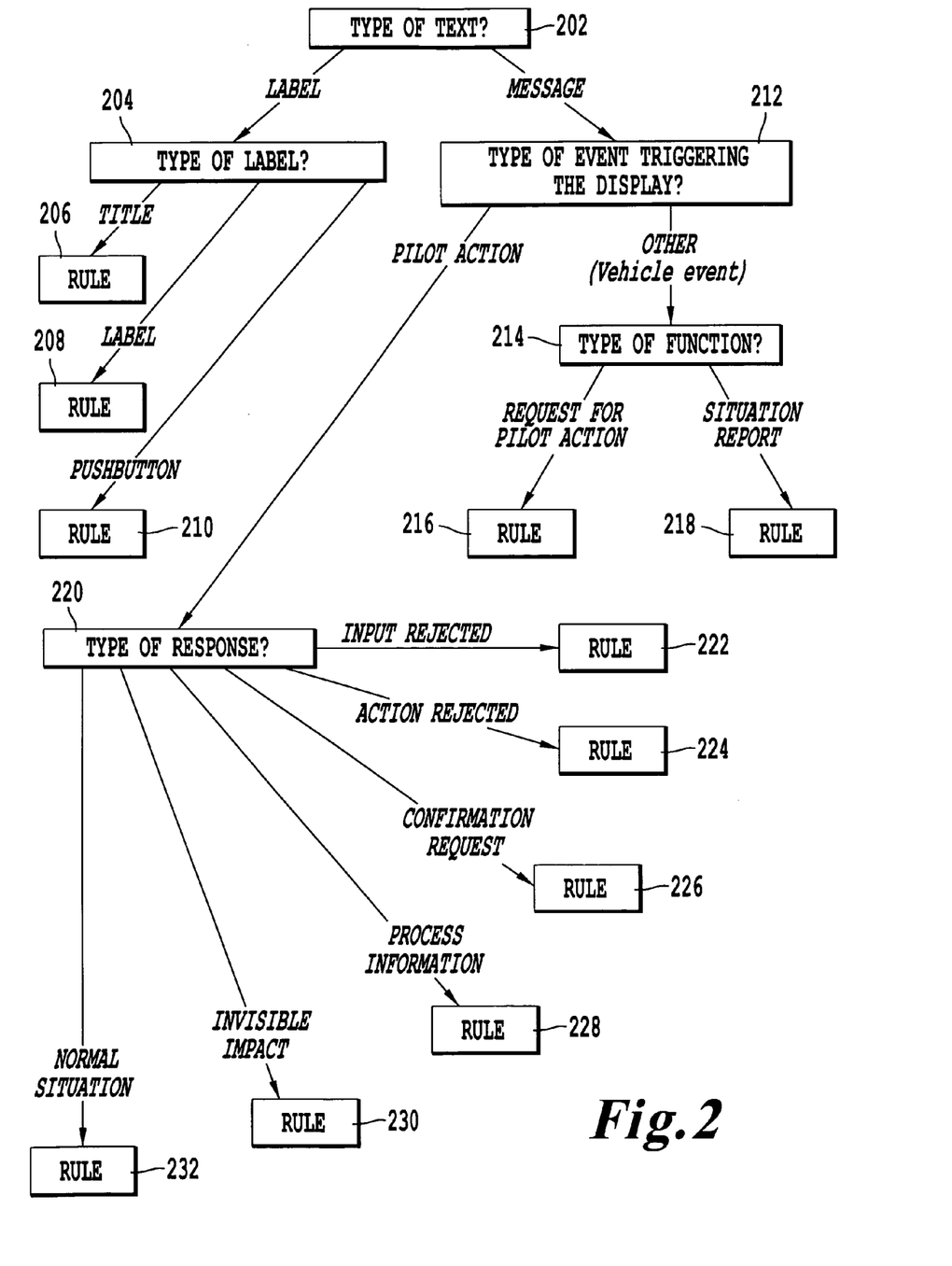
FIG. 2 illustrates a first example of a network of choices and rules to be displayed, in particular embodiments of the method and of the device which are objects of the present invention.
Figure 3:
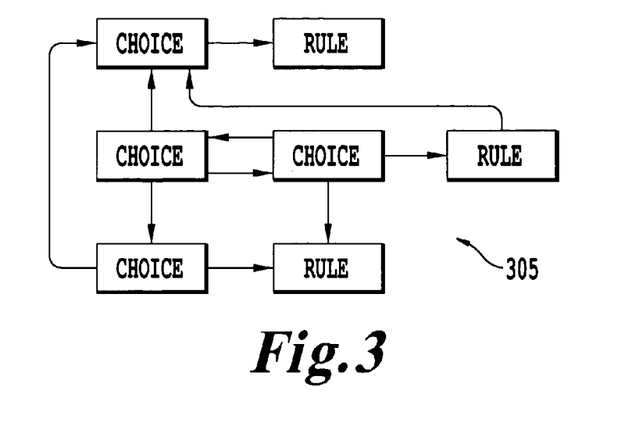
FIG. 3 illustrates a second example of a network of choices and of rules to be displayed, in particular embodiments of the method and of the device which are objects of the present invention.

Such a network may have the form of a tree structure, as illustrated in FIG. 2, or of a less structured network, as illustrated in FIG. 3. It will be recalled here that a tree structure is a set of nodes starting from a root, in such a way that only a single path arrives at each node.

The tree structure illustrated in FIG. 2 has a root 202, corresponding to a choice between two types of texts, "label" or "message". In fact, a distinction is made between the texts involved in organization of the user interface, or "labels", and the texts that function as events and are related to the functioning of the system, the "messages".

The choice of "label" provides access to a node 204, corresponding to a choice among three types of labels, "title", "label" or "pushbutton". The choice of "title" provides access to a node 206 for choosing rules. Each of these choices leads to display of at least one design rule, which depends on the choices made successively to attain it, respectively 202, 204, 206. The choice of "label" at node 204 provides access to a node 208 for choosing among rules. Each of these choices leads to display of at least one design rule, which depends on the choices made successively to attain it, respectively 202, 204 and 208. The choice of "pushbutton" provides access to a node 210 for choosing among rules. Each of these choices leads to display of at least one design rule, which depends on the choices made successively to attain it, respectively 202, 204 and 210.

Returning to root 202, the choice of "message" provides access to a node 212, corresponding to the choice of a type of event that triggers the display of the message to be designed, between "immediate response to an action of the pilot" and "others (airplane/system event)". The first choice provides access to a node 220 for choosing among "response to a refused input" (a value not accepted by the system in question), "response to a refused action" (an action that cannot be accomplished, at least in part), "request for confirmation" (for an action considered to be critical), "information about a process" (to provide information about the normal execution time or response time of the process), "information about an invisible impact of the action of the pilot" and "information about a normal situation". Each of these choices leads to display of at least one design rule, which depends on the choices made successively to attain it, respectively 202, 212, 220 and 222 to 232. The choice of "others (airplane/system event)" at node 230 provides access to a node 246 for choosing among "request for action of the pilot", "report of a normal situation" and "report of an abnormal situation". Each of these choices leads to display of at least one design rule, which depends on the choices made successively to attain it, respectively 202, 212, 214, 216 and 218.

As shown in FIG. 3, the network of nodes may also have a form 305 that is not a tree structure. For example, a text to be displayed in response to confirmation of an action may employ the same rules as a text to be displayed in response to an action, in which case the network then contains a loop.

Figure 4:
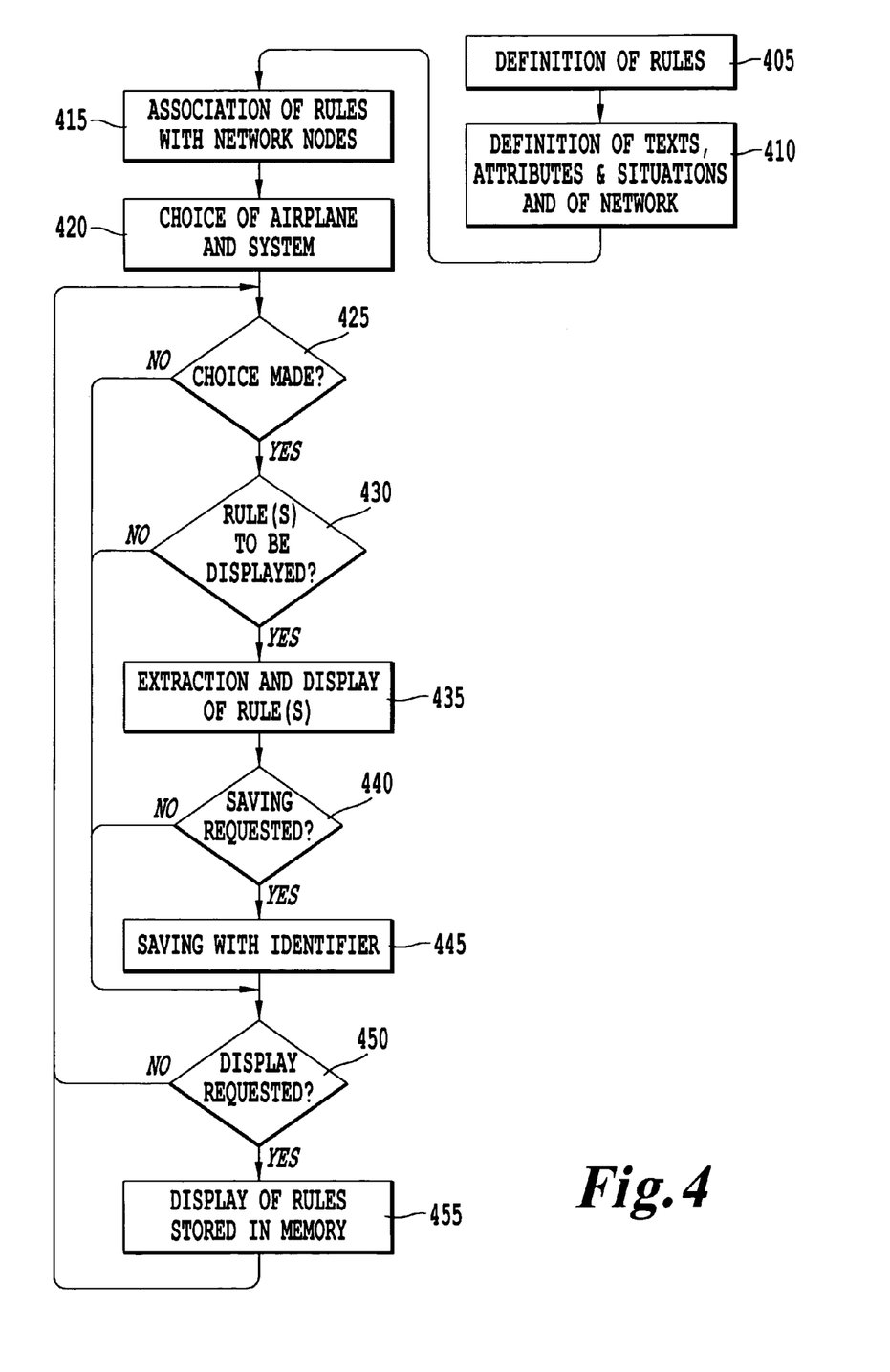
FIG. 4 represents, in the form of a logic diagram, steps employed in a particular embodiment of the method which is the object of the present invention.

As shown in FIG. 4, in one embodiment there is first performed a step 405 of defining text design rules (messages or labels) to be applied within the context of a vehicle, such as an airplane in the course of development.

For example, to define these rules, tests of different texts having the same significance are performed with and without display context (for example, outside and in a flight simulator), and the level and speed of good understanding are measured over a population, for example comprising pilots of different languages and nationalities. It is then determined how the texts understood best and most rapidly are structured, and design rules are deduced on this basis. This step is preferably recurrent.

In the same manner, text models respecting the rules and text models not respecting the rules are defined. Texts used in other similar vehicles and corresponding to the rules in question are also collected.

Then, in the course of a step 410, there are defined types of texts, attributes of texts and situations in which these texts will be displayed, and there is structured a network of nodes corresponding to choices that the text designers will be able to make in order to define the display context of a text or the nature of the text.

In the course of a step 415, design rules for texts to be displayed and text models according to these rules are assigned to the nodes and/or terminations of the network.

In the course of a step 420, a text designer provides an identifier of the text to be designed, such as the type of airplane in question, a type of on-board system in question (emergency situation manager, system display SD, air traffic control ATC, flight management system FMS, for example), and starts from a network node, for example the root of a tree structure if the network has this form. The choices accessible from the current network node are then displayed.

In the course of a step 425, it is determined whether the designer has made a choice among the choices associated with the current position in the network. This choice may be made by selection with a pointing device, such as a mouse.

If no, the program skips to a step 450. If yes, in the course of a step 430, it is determined whether, as a function of the choice made by the designer, at least one rule and/or one text model must be displayed on the screen of a design workstation. It is determined, in fact, whether at least one rule and/or at least one model is associated with the new network node or termination attained by following the designer's choice.

If no, the program skips to step 450. If yes, in the course of a step 435, each rule associated with the attained network node is determined, each rule is extracted from a global list of rules and each rule or text model to be displayed is displayed, preferably in a window into which these rules may be exported, copied and/or printed.

Then, in the course of a step 440, it is determined whether the designer has requested the saving of at least one rule and/or at least one displayed model. If no, the program skips to step 450. If yes, in the course of a step 445, each rule and/or each selected model is placed in a memory, in association with an identifier of the text being designed.

Then, in the course of a step 450, it is determined whether the designer has requested display of the rules and/or models stored in memory. If no, the program returns to step 425. If yes, in the course of a step 455, the rules and/or models stored in memory are displayed in a dedicated window on the screen of the workstation, the successive choices associated with the current position in the network remaining displayed in another window. Then the program returns to step 425.

As shown in FIG. 5, a display screen 500 employed by particular embodiments of the method and device which are objects of the present invention is provided with:

- a window 505 for displaying the type of airplane in question,
- a window 510 for displaying the system in question,
- a window 515 for displaying a list of accessible choices,
- a window 520 for displaying identifiers of the design rules applicable to the choice in progress,
- a window 525 for displaying identifiers of the design rules stored in memory at the designer's request, and a window 530 for displaying the contents of a rule and text models that respect the said rule and text models that do not respect the said rule.

As is understood from reading the foregoing description, the employment of the present invention makes consultation of the rules easy and contextual. Correlatively, the employment of the present invention reduces the number of rules that the designer must consult to design a given text (message or label), by eliminating the inappropriate rules. It provides the designer with the rules appropriate to a situation in which the text to be designed will be displayed, and possibly a glossary of the vocabulary to be employed, text models and/or equivalent texts already designed for other airplanes. The texts designed by employing the present invention are therefore more effective, consistent with each other and consistent among different designers.

An example of a set of rules that may be displayed is presented below. This set is composed of ten fundamental rules:

"do not use",
"use of the glossary",
"plural mark",
"prefix",
"message construction",
"word order: head",
"word order: attributes",
"negation",
"coordination",
"condition and additional information".

For example, the coordination is explicit and is applied to constituents of the same syntactic category.

What is claimed is:

1. A device implementing computer-assisted design of a message composed of a plurality of words to be displayed in an aircraft, comprising:
a means for constituting a network of nodes associated with choices, at least part of said nodes corresponding to a choice of a type of the message, at least part of said nodes corresponding to a choice of message display context, at least part of said nodes corresponding to a determination of whether the message is provided in response to an action of a user, and at least part of said nodes corresponding to a determination that the message display originates from a transducer;
a means for associating message design rules with at least part of said nodes;
a means for pathfinding in said network of nodes, by a designer, based on a response to a choice associated with each node encountered in the network of nodes; and
for each node encountered during said pathfinding, a means for making each rule associated with the encountered node available to the designer.

2. The device according to claim 1, wherein the means for constituting said network of nodes corresponds to choices and rules to be displayed to the designer and at least part of said nodes correspond to a choice of whether the message to be designed is related to a continuous interface or to an event.

3. The device according to claim 2, wherein the means for constituting said network of nodes is adapted in such a way that at least part of the said nodes corresponds to a choice of a type of means for displaying the message to be designed.

4. The device according to claim 1, wherein the means for constituting said network of nodes corresponds to choices and rules to be displayed to the designer and is adapted in such a way that at least part of said nodes correspond to a choice of a type of means for displaying the message to be designed.

5. The device according to claim 1, wherein the associating means associates with at least part of said nodes, fundamental rules corresponding to a set of rules according to a predetermined choice and specific rules related to a set of messages to be designed.

6. The device according to claim 1, wherein the associating means associates, with at least part of said nodes, rules relating to using a glossary, rules relating to a syntactic structure and rules relating to an information content, of the message to be displayed.

7. The device according to claim 1, wherein the associating means associates, with at least part of said nodes, rules specifying message patterns.

8. The device according to claim 1, wherein the associating means associates hypertext links with at least part of said nodes.

9. A method for computer-assisted design of a message composed of a plurality of words to be displayed in an aircraft, comprising:
a step of constituting, by a computer, a network of nodes associated with choices, at least part of said nodes corresponding to a choice of a type for the message, at least part of said nodes corresponding to a choice of message display context, at least part of said nodes corresponding to a determination of whether the message is provided in response to an action of a user, and at least part of said nodes corresponding to a determination that the message display originates from a transducer;
a step of associating message design rules with at least part of said nodes;
a step of pathfinding in said network of nodes, by a designer, based on a response to a choice associated with each node encountered in the network of nodes; and
for each node encountered during said pathfinding, a step of making each rule associated with the encountered node available to the designer.

10. The method according to claim 9, wherein, during the step of constituting, said network of nodes are associated with choices and rules to be displayed to the designer, and at least part of said nodes correspond to a choice of whether the message to be designed is related to a continuous interface or to an event.

11. The method according to claim 10, wherein, during the step of constituting said network of nodes, at least part of said nodes correspond to a choice of a type of means for displaying the message to be designed.

12. The method according to claim 9, wherein, during the step of constituting, said network of nodes are associated with choices and rules to be displayed to the designer, and at least part of said nodes correspond to a choice of a type of means for displaying the message to be designed.

13. The method according to claim 9, wherein, during the associating step, at least part of said nodes are associated with fundamental rules corresponding to a set of rules according to a predetermined choice and specific rules related to a set of messages to be designed.

14. The method according to claim 9, wherein, during the association step, at least part of said nodes are associated with rules relating to using a glossary, rules relating to a syntactic structure, and rules relating to an information content of the message to be displayed.

15. The method according to claim 9, wherein, during the associating step, at least part of said nodes are associated with rules specifying message patterns.

16. The method according to claim 9, wherein, during the associating step, hypertext links are associated with at least part of said nodes.

17. A non-transitory computer-readable storage medium having computer readable program codes embodied in the computer readable storage medium that, when executed cause a computer to execute:
constituting a network of nodes associated with choices, at least part of said nodes corresponding to a choice of a type for the message, at least part of said nodes corresponding to a choice of message display context, at least part of said nodes corresponding to a determination of whether the message is provided in response to an action of a user, and at least part of said nodes corresponding to a determination that the message display originates from a transducer;
associating message design rules with at least part of said nodes;
pathfinding in said network of nodes, by a designer, based on a response to a choice associated with each node encountered in the network of nodes; and
for each node encountered during said pathfinding, making each rule associated with the encountered node available to the designer.

18. The device according to claim 1,
wherein each rule associated with the encountered node is extracted from a global list of rules and displayed for at least one of exporting, copying, and printing.

19. The device according to claim 1,
wherein a text model for the message is also associated with the encountered node.

20. The device according to claim 1,
wherein each rule is displayed with successive choices associated with a current position in said network of nodes.

* * * * *